US010181225B2

(12) United States Patent
Liebl et al.

(10) Patent No.: US 10,181,225 B2
(45) Date of Patent: Jan. 15, 2019

(54) SCAN TOOL WITH MOBILE BROADBAND CAPABILITY AND METHOD OF OPERATION THEREOF

(75) Inventors: Troy Liebl, Owatonna, MN (US); Edward Lipscomb, Lakeville, MN (US); Manokar Chinnadurai, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 1038 days.

(21) Appl. No.: 12/849,106

(22) Filed: Aug. 3, 2010

(65) Prior Publication Data

US 2011/0035096 A1 Feb. 10, 2011

Related U.S. Application Data

(60) Provisional application No. 61/232,030, filed on Aug. 7, 2009.

(51) Int. Cl.
*G01M 17/00* (2006.01)
*G07C 5/08* (2006.01)
*G07C 5/00* (2006.01)

(52) U.S. Cl.
CPC ........... *G07C 5/0808* (2013.01); *G07C 5/008* (2013.01); *G07C 2205/02* (2013.01)

(58) Field of Classification Search
CPC ... G07C 5/0808; G07C 5/008; G07C 2205/02
USPC ...... 701/35, 29, 29.1, 31.4, 33.2, 33.4, 34.4, 701/32.2; 702/183; 455/456.1
See application file for complete search history.

(56) References Cited

U.S. PATENT DOCUMENTS 5,705,743 A * 1/1998 Leonard ................. G01D 3/022 701/101
6,693,367 B1 * 2/2004 Schmeisser ........... G01M 15/05 307/9.1
7,085,680 B2 * 8/2006 Huang ................ G06F 11/0739 702/119
2002/0183904 A1 * 12/2002 Sakurai .................. G07C 5/008 701/31.4
2002/0193925 A1 * 12/2002 Funkhouser ......... G07C 5/0808 701/31.8
2003/0208309 A1 * 11/2003 Triphathi ............... G07C 5/008 701/33.4
2004/0227523 A1 * 11/2004 Namaky ............... H04L 67/125 324/537
2005/0159923 A1 * 7/2005 Huang ................ G06F 11/0739 702/183
2006/0142908 A1 * 6/2006 Grier .................... G07C 5/0808 701/31.4
2008/0004764 A1 * 1/2008 Chinnadurai ...... G05B 23/0235 701/31.4
2008/0071440 A1 * 3/2008 Patel ...................... G07C 5/008 701/31.4

(Continued)

*Primary Examiner* — Shardul D Patel
(74) *Attorney, Agent, or Firm* — Baker & Hostetler LLP

(57) ABSTRACT

A vehicle diagnostic tool that is configured to perform one or more diagnostic tests on one or more systems of a vehicle. Once the test has been performed and data collected, the data may be forwarded to a location outside of the diagnostic tool through a mobile broadband connection device that is inserted into the diagnostic tool through a designated port. Also, a method of performing a vehicle diagnostic test utilizing such a diagnostic tool.

19 Claims, 3 Drawing Sheets

(56) References Cited

U.S. PATENT DOCUMENTS

| | | | | |
|---|---|---|---|---|
| 2008/0119981 | A1* | 5/2008 | Chen | G05B 23/0267 701/31.4 |
| 2008/0154459 | A1* | 6/2008 | Grichnik | G06Q 10/06 701/29.4 |
| 2008/0316006 | A1* | 12/2008 | Bauman | G07C 5/008 340/425.5 |
| 2009/0276115 | A1* | 11/2009 | Chen | G07C 5/008 701/29.6 |
| 2009/0325596 | A1* | 12/2009 | Oesterling | H04W 4/20 455/456.1 |
| 2010/0174446 | A1* | 7/2010 | Andreasen | G07C 5/008 701/31.4 |
| 2010/0210254 | A1* | 8/2010 | Kelly | G07C 5/008 455/418 |

* cited by examiner

SCAN TOOL WITH MOBILE BROADBAND CAPABILITY AND METHOD OF OPERATION THEREOF

CROSS-REFERENCE TO RELATED APPLICATIONS

This application claims priority to provisional U.S. patent application entitled "Scan Tool with Mobile Broadband Capability and Method of Operation Thereof," filed Aug. 7, 2009, having Ser. No. 61/232,030, the disclosure of which is hereby incorporated by reference in its entirety.

FIELD OF THE INVENTION

The present invention relates generally to devices and systems designed to perform diagnostic tests on vehicle systems. The present invention also relates generally to methods for testing vehicle systems.

BACKGROUND OF THE INVENTION

Currently available vehicle diagnostic tools (i.e., "scan tools") are computerized apparatuses that are configured to be electronically connected to vehicles. Once connected, diagnostic tests may be performed by the vehicle diagnostic tools on one or more systems within the vehicles. For example, some currently available vehicle diagnostic tools are configured to be electronically connected to an automobile via, for example, a cable connector. Once connected, systems such as, for example, the antilock braking system and/or the transmission system of the automobile may be monitored and/or diagnosed (e.g., for error codes, rotations per minute, voltage levels, etc.).

Although some individuals do purchase the above-mentioned vehicle diagnostic tools for personal use on their own automobiles, farm machinery, motorcycles, boats, etc., such diagnostic tools are more commonly found in commercial vehicle repair shops. Whether for personal or commercial usage, however, currently available diagnostic tools are relatively limited in the manner in which they may transfer data collected during the diagnostic tests that they perform to other electronic devices. For example, wired cables are typically used when transferring collected vehicle data from a diagnostic tool to a more sophisticated computing device having the ability to more rigorously process the collected data. Even when wireless data transfer is available, a local wireless network first has to be installed and then has to be maintained at the location where the vehicle diagnostic tool is going to be used.

SUMMARY OF THE INVENTION

At least in view of the above, it would be desirable to provide novel vehicle diagnostic tools that are configured to transfer data (e.g., to more sophisticated computing devices) not only wirelessly but also independently of locally established and/or maintained wireless networks. It would also be desirable to provide novel methods for effectuating such data transfer.

The foregoing needs are met, to a great extent, by one or more embodiments of the present invention. According to one such embodiment, a vehicle diagnostic tool is provided which can comprise a processor configured to implement software for conducting a diagnostic test on at least one electronic control unit of a vehicle, a memory electronically connected to the processor and configured to store data relevant to conducting the diagnostic test, a vehicle connector interface electronically connected to the processor and configured to accommodate a connector between the vehicle diagnostic tool and the at least one electronic control unit, and a mobile broadband port electronically connected to the processor and configured to electronically interface with a mobile broadband connection device.

In accordance with another embodiment of the present invention, a method of performing a vehicle diagnostic test is provided which can connect a vehicle diagnostic tool to a vehicle, perform a diagnostic test on at least one electronic control unit of the vehicle using the diagnostic tool, and transmit information obtained during the diagnostic test from the diagnostic tool to a remote computing device using a mobile broadband connection device.

In accordance with yet another embodiment of the present invention, another vehicle diagnostic tool is provided, which can comprise a means for processing configured to implement software for conducting a diagnostic test on at least one electronic control unit of a vehicle, a means for storing electronically connected to the means for processing and configured to store data relevant to conducting the diagnostic test, a means for connecting electronically connected to the means for processing and configured to accommodate a connector between the vehicle diagnostic tool and the at least one electronic control unit, and a means for interfacing electronically connected to the means for processing and configured to electronically interface with a mobile broadband connection device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
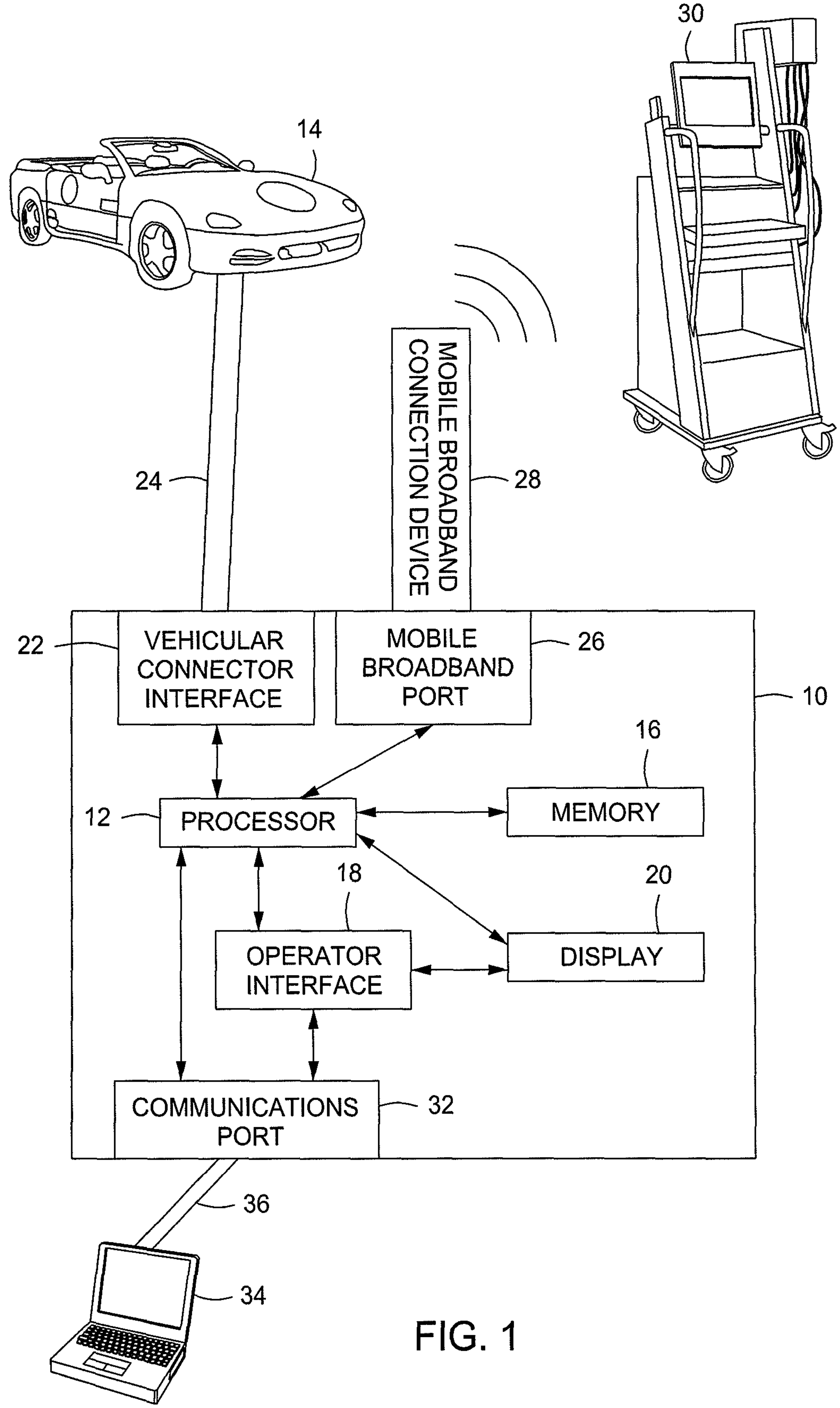
FIG. 1 is a schematic diagram of a vehicle diagnostic tool within a shop environment according to an embodiment of the present invention.

The invention will now be described with reference to the drawing figures, in which like reference numerals refer to like parts throughout. FIG. 1 is a schematic diagram of a vehicle diagnostic tool 10 within a shop environment according to an embodiment of the present invention. As illustrated in FIG. 1, the diagnostic tool 10 includes a processor 12. This processor 12 is typically configured to implement software for conducting a diagnostic test on at least one electronic vehicle system (or electronic control unit (ECU)) on a vehicle 14.

Although the diagnostic tool 10 illustrated in FIG. 1 is connected to an automobile 14, no particular restrictions are made on the type of vehicle that may be diagnosed using the diagnostic tool 10 according to the present invention. Also, no particular restrictions are made on the types of electronic vehicle systems (or ECU) that may be diagnosed according to the present invention or on the types of tests that may be performed. For example, automotive braking systems may be tested for hydraulic pressure, the voltage and/or current levels of shipboard lighting systems may be tested and the rotations per minute of transmission systems in pieces of heavy farm equipment may be monitored.

The vehicle diagnostic tool 10 illustrated in FIG. 1, in addition to the already discussed processor 12, also includes a memory 16, an operator interface 18 and a display 20. According to certain embodiments of the present invention, the memory 16 is electronically connected to the processor 12 and is configured to store data relevant to conducting diagnostic tests (e.g., information about typically operating parameters of particular makes/models/years of automobiles when operating properly or optimally). Also, the memory 16 may be used to store data that is collected during diagnostic tests and/or to store diagnostic test computer programs that may be implemented using the processor 12.

The operator interface 18, according to certain embodiments of the present invention, is electronically connected to the processor 12 and is configured to allow an operator of the vehicle diagnostic tool 10 to provide input to the tool 10. As such, the operator interface 18, according to certain embodiments of the present invention, includes one or more of a keyboard, a touchpad, a joystick, a microphone and a trackball.

Like the memory 16 and the operator interface 18, the display 20 is also electronically connected to the processor 12. In addition, the display 20 is typically configured to present data from diagnostic tests performed by the diagnostic tool 10 in a format that is readable by an operator of the diagnostic tool 10. As such, according to certain embodiments of the present invention, the display 20 includes one or more light sources (e.g., light-emitting-diodes that may function as warning lights) and/or a screen capable of displaying text and/or illustrations. Also, according to other embodiments of the present invention, a speaker (not illustrated) that is configured to generate audio feedback for the operator (e.g., alarms, recorded instructions, etc.) is also included in the vehicle diagnostic tool 10 as part of the display 20. The display can also act as the operator interface 18 by having a touch screen or other interface components.

Also illustrated in FIG. 1 as part of the diagnostic tool 10 is a vehicle connector interface 22 that is electronically connected to the processor 12. The vehicle connector interface 22 has the ability to communicate in various communication protocols such as Controlled Area Network (CAN), J1850 VPM and PWM, ISO 9141, Keyword 2000 and others. Typically, the vehicle connector interface 22 is configured to accommodate a connector between the vehicle diagnostic tool 10 and at least one electronic vehicle system within the automobile 14. In FIG. 1, the connector in question is a cable 24 that extends between the connector interface 22 and the automobile 14. Although a number of different ways of connecting to a vehicle are within the scope of the present invention, the cable 24 illustrated in FIG. 1 is an SAE J1850 cable that is connected to the SAE J1850 interface (not illustrated in FIG. 1) of the automobile 14.

Another component illustrated in FIG. 1 as being included within the vehicle diagnostic tool 10 is a mobile broadband port 26 According to certain embodiments of the present invention, the processor 12, memory 16, operator interface 18, display 20, vehicle connector interface 22 and mobile broadband port 26 are all contained within a portable housing. As such, the entire vehicle diagnostic tool 10 may conveniently be moved from one vehicle to another. In fact, according to certain embodiments of the present invention, the diagnostic tool 10 is both relatively light (e.g., only weighs a few pounds) and configured to be handheld. As such, not only is relocation of the tool 10 from one vehicle to another is simple, but so is storing the tool 10, for example, in the drawer of a tool chest.

The above-mentioned mobile broadband port 26 may, as illustrated in FIG. 1, be electronically connected to the processor 12 and is typically configured to electronically interface with a mobile broadband connection device 28 as illustrated in FIG. 1. Once the mobile broadband connection device 28 is interfaced with the port 26, data stored, for example, in the memory 16 of the diagnostic tool 10 may be forwarded to a remote location such as the remote data processing station 30. Once at the processing station 30, the data may be processed using more sophisticated software than is available within the diagnostic tool 10 and may be displayed on a larger screen with more resolution than is available within the display 20 of the diagnostic tool 10.

In addition to the mobile broadband port 26, FIG. 1 illustrates that the vehicle diagnostic tool 10 also includes a communications port 32 that is linked to an external computing device 34 via a removable cable 36. According to certain embodiments of the present invention, the communications port 32 is a relatively traditional connection port. As such, port 32 may allow for communication and/or transfer of data (e.g., of data collected during one or more diagnostic tests) between the diagnostic tool 10 and the external computing device 34. According to certain embodiments of the present invention, at least one of the RS232 protocol, the USB protocol and the Ethernet protocol is used for such communication/transfer. According to certain other embodiments of the presentation, the cable 36 is not used and the communications port 32 is configured to communicate/transfer data wirelessly with the external computing device 34. This may be done, for example, by using the WiFi™ protocol or the Bluetooth® protocol through a locally-installed and maintained wireless network designed to accommodate such communication (e.g., a wireless local area network set up within an automotive repair shop).

Figure 2:
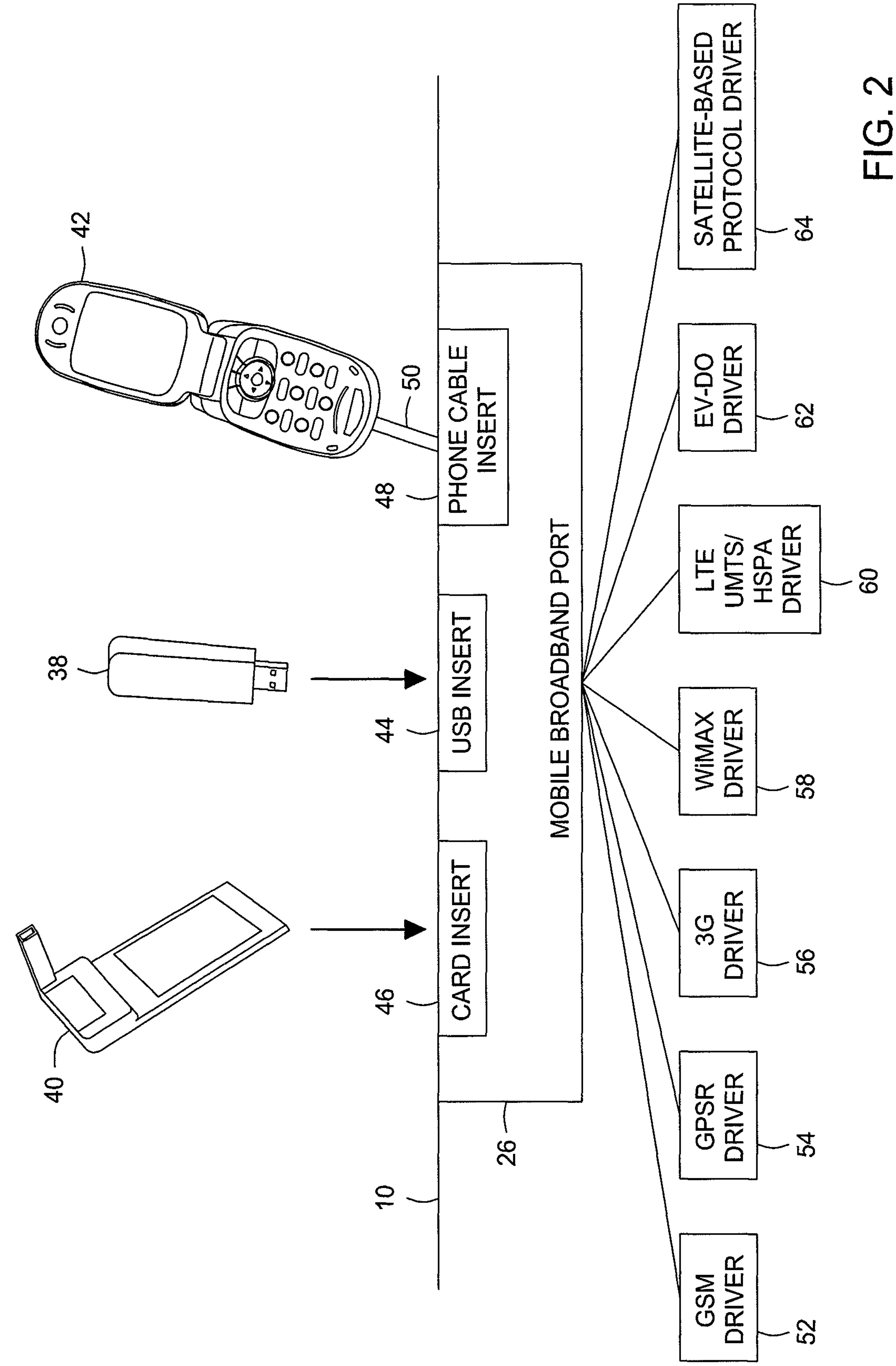
FIG. 2 is a schematic diagram of a portion of the vehicle diagnostic tool illustrated in FIG. 1.

FIG. 2 is a schematic diagram of a portion of the vehicle diagnostic tool 10 illustrated in FIG. 1. More specifically, FIG. 2 focuses in on the mobile broadband port 26 and illustrates some of the mobile broadband devices that may interface with this port 26. As illustrated in FIG. 2, the mobile broadband connection device 28 shown in FIG. 1 may take the form of, for example, a portable modem such as the USB modem 38 illustrated, a PC data card 40 and a mobile telephone 42 which, according to certain embodiments of the present invention, includes a data modem. In addition, the mobile broadband connection device 28 may also include any other portable device that includes built-in or attachable support for mobile broadband.

As illustrated in FIG. 2, according to certain embodiments of the present invention, portions of the USB modem 38 and/or PC data card 40 may be directly plugged into designated inserts that are located within the mobile broadband port 26. The mobile phone 42, on the other hand, is typically connected to an appropriately configured insert 48 through a cable 50. However, configuring the mobile broadband port 26 to directly receive a portion of the mobile phone 42 and/or any other broadband-capable device is also within the scope of the present invention.

FIG. 2 illustrates that a plurality of software drivers may be interfaced with the mobile broadband port 26. More specifically, a GSM driver 52, a GPRS driver 54, a 3G driver 56, a WiMAX driver 58, an LTE UMTS/HSPA driver 60, an EV-DO driver 62 and a portable satellite-based system protocol driver 64 may be configured within the diagnostic tool 10. As such, according to certain embodiments of the present invention, the mobile broadband connection device 28 illustrated in FIG. 1 (and any of the representative embodiments thereof illustrated in FIG. 2) may utilize any of these communications protocols to implement broadband communication with a remotely located device (e.g., remote processing station 30). By having the broadband connections, the diagnostic tool's wireless communication protocol is not limited to the local wireless network that has been set up in a garage or service facility. This allows the manufacturer of the diagnostic tools to deploy the tools with wireless communication to any location and allow wireless communication to occur once the diagnostic tool is turned on for the first time. The diagnostic tool can be provided to the user preconfigured to communicate to the desired remote computing device and thus the user does not have to add any passwords in order to connect wirelessly.

Figure 3:
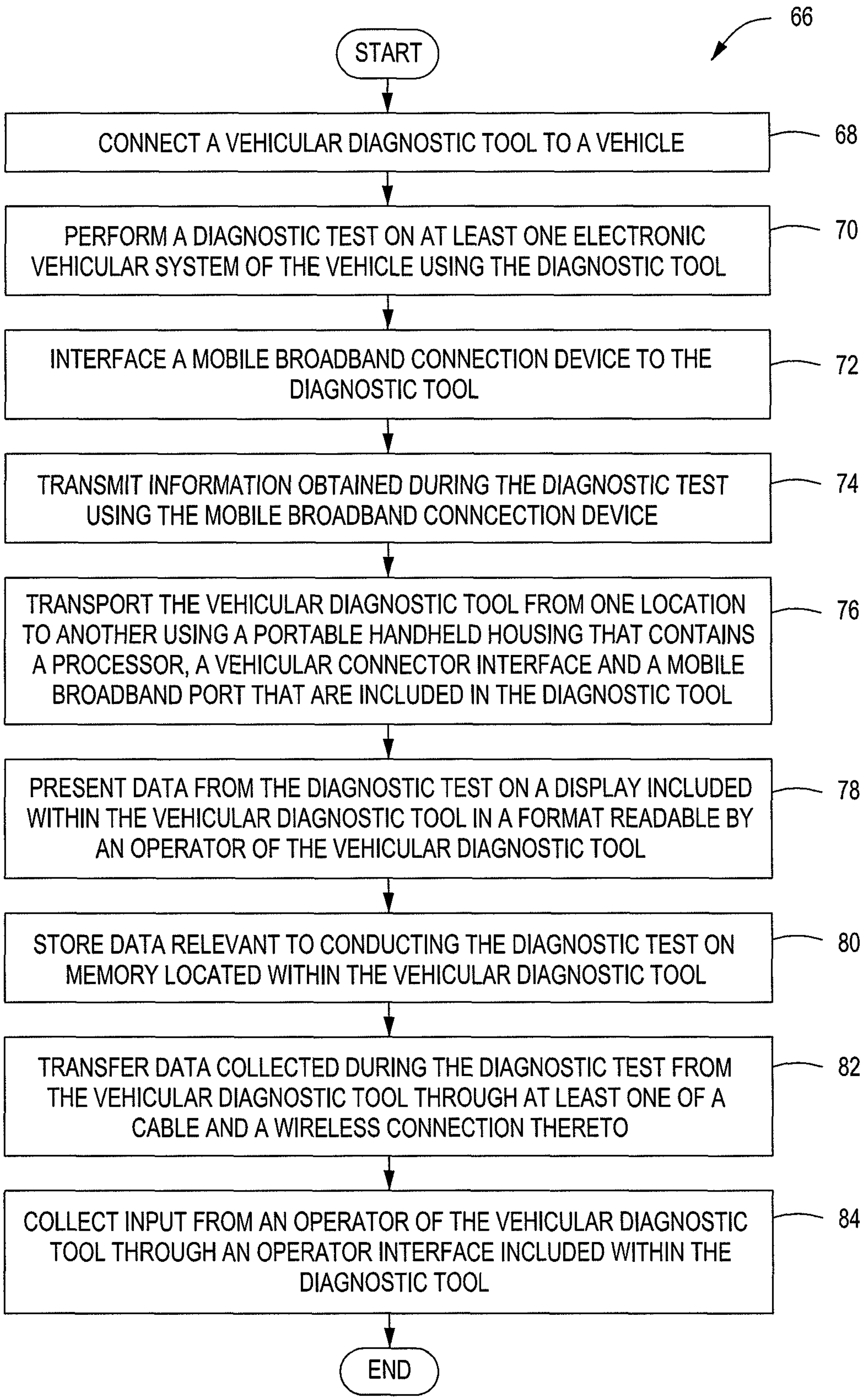
FIG. 3 is a flowchart illustrating the steps of a method of performing a vehicle diagnostic test and transferring of the vehicle data according to an embodiment of the present invention.

FIG. 3 is a flowchart 66 illustrating the steps of a method of performing a vehicle diagnostic test and transferring test data according to an embodiment of the present invention. According to certain embodiments of the present invention, the steps included in the flowchart 66 are implemented utilizing the vehicle diagnostic tool 10 discussed above and illustrated in FIGS. 1 and 2.

Step 68 of the method illustrated in FIG. 3 specifies connecting a vehicle diagnostic tool to a vehicle. This step may be implemented, for example, by connecting an SAE J1850 cable between an automobile's SAE J1850 interface and the vehicle connector interface 22 of the diagnostic tool 10 illustrated in FIG. 1. Using this cable connection, data may be collected from a vehicle by the diagnostic tool 10 and communication may be established between the diagnostic tool 10 and one or more systems (ECU) within the vehicle.

According to step 70, a diagnostic test is then performed on at least one electronic vehicle system of the vehicle using the diagnostic tool. No particular restrictions are placed either on the diagnostic test that may be performed or on the system (ECU) that may tested/monitored. As such, in addition to strictly electronic systems, the testing of mechanical system having electronic monitoring, control and/or actuation also falls within the scope of the present invention.

The next step illustrated in FIG. 3 is step 72, which specifies interfacing a mobile broadband connection device to the diagnostic tool. In order to implement this step, a variety of items may be used as the mobile broadband connection device. For example, a portable modem or a mobile telephone may be used. In addition, a personal computer (PC) data card may be used, as may a USB modem, a phone with a data modem and/or any other portable device with built-in support for mobile broadband. Optionally, the mobile broadband may have been previously shipped with the tool 10 and previously activated.

According to step 74 of the flowchart 66, information obtained during the diagnostic test is transmitted to a remote computing device using the mobile broadband connection device. When using the mobile broadband connection device 28 illustrated in FIGS. 1 and 2, this step may be implemented, for example, by transmitting diagnostic test data to the remote processing station 30.

This transmitting step 74 provides the ability to transfer information wirelessly from a diagnostic tool to a remote location without using a wireless system that is either implemented or maintained locally, usually by one individual or small company. In other words, no local area network needs to be set up in an automotive repair shop and no wireless routers need to be configured or maintained locally according to certain embodiments of the present invention. Rather, the networks established and maintained by national or multinational wireless broadband providers using their cell phone towers or satellites may be used. As such, typically, the transmitting step 74 includes utilizing a communications protocol that includes at least one of the GSM protocol, the GPRS protocol, the 3G protocol, the WiMAX protocol, the LTE UMTS/HSPA protocol, the EV-DO protocol and one of the numerous portable satellite-based system protocols that would become apparent to one of skill in the art to use upon practicing one or more embodiments of the present invention.

Step 76 specifies transporting the vehicle diagnostic tool from one location to another using a portable handheld housing that contains a processor, a vehicle connector interface and a mobile broadband port that are included in the diagnostic tool. This transporting step 76 may be implemented using the diagnostic tool 10 illustrated in FIG. 1, wherein all of the illustrated components within the diagnostic tool 10 are contained within a lightweight enclosure that can easily be picked up and moved by a user of the diagnostic tool 10.

According to step 78, data from the diagnostic test is presented on a display that is included within the vehicle diagnostic tool. This presentation is in a format that is readable by an operator of the vehicle diagnostic tool. For example, according to certain embodiments of the present invention, the data may be presented in graphical format or as a spreadsheet on a small screen contained within the diagnostic tool. Also, according to certain embodiments of the present invention, the data may be presented in real time as the vehicle system is being diagnosed.

As specified in step 80 of the flowchart 66, data relevant to conducting the diagnostic test is stored on memory that is located within the vehicle diagnostic tool. In other words, according to certain embodiments of the present invention, data such as, for example, baseline or reference data for internal electronic systems of a wide variety of different automotive makes and models in different years may be stored in memory. The data received from the vehicle diagnostic testing is also saved on the memory. Also, software for conducting the diagnostic tests may be stored in the memory.

Step 82 specifies transferring data that was collected during the diagnostic test from the vehicle diagnostic tool through at least one of a cable and a wireless connection thereto. When implemented using the diagnostic tool 10 illustrated in FIG. 1, the communications port 32 may be used either along with the illustrated cable 26 or wirelessly. The data test results can be transferred via the broadband connection to a remote computing device. Alternatively or in addition to the broadband, the tool can transfer data and test results wirelessly through the communication port using Wifi™ or Bluetooth® protocol. This provides an alternative to using the mobile broadband connection device 28 in locations where wired connections or local wireless networks are available.

The last step included in flowchart 66 (i.e., step 84) specifies collecting input from an operator of the vehicle diagnostic tool through an operator interface that is included within the diagnostic tool. Such input may be collected through, for example, a keyboard, a touchscreen, a joystick, a keypad, a microphone or any other form of user interface that one of skill in the art would identify as appropriate to use upon practicing one or more embodiments of the present invention. Through this interface, the user may, for example, start and/or end a diagnostic test, alter testing parameters, identify the system to be tested, etc.

The steps disclosed in flow chart 66 may all be implemented as shown or steps may be optionally done. Further, the steps disclosed in flow chart 66 do not have to be performed in order and can be done in any order desired by the user.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostic tool, comprising:

a processor configured to implement software for conducting a diagnostic test on at least one electronic control unit of a vehicle;

a memory electronically connected to the processor and configured to store data relevant to conducting the diagnostic test;

a vehicle connector interface electronically connected to the processor and configured to accommodate a connector between the vehicle diagnostic tool and the at least one electronic control unit;

a display electronically connected to the processor and configured to present data from the diagnostic test in a format readable by an operator of the vehicle diagnostic tool;

a mobile broadband port electronically connected to the processor and configured to electronically interface with a mobile broadband connection device and further configured to forward at least a portion of the data relevant to conducting the diagnostic test to a data processing station through the mobile broadband connection device via a wireless broadband provider network;

a communications port electronically connected to the processor and configured to transfer data to an external computing device from the diagnostic test through a wired and wireless connection; and a portable handheld housing configured to contain the processor, the memory, the vehicle connector interface, the mobile broadband port, and the communications port, wherein the mobile broadband connection device is configured to be activated for communication with a wireless broadband provider before use by a technician;

wherein the mobile broadband connection device comprises a mobile telephone;

wherein the mobile broadband port is configured to directly receive a portion of the mobile telephone;

wherein the mobile broadband port is configured to forward at least a portion of the data relevant to conducting the diagnostic test to the data processing station through the mobile telephone via the wireless broadband provider network; and wherein the mobile telephone utilizes a communications protocol that includes at least one of GSM, GPRS, 3G, WiMAX, LTE UMTS/HSPA, EV-DO and a portable satellite-based system protocol.

2. The vehicle diagnostic tool of claim 1, further comprising:

an operator interface electronically connected to the processor and configured to allow an operator of the vehicle diagnostic tool to provide input to the vehicle diagnostic tool.

3. The vehicle diagnostic tool of claim 2, wherein the operator interface includes at least one of the following: a keyboard, a touchpad, a joystick, a microphone, and a trackball.

4. The vehicle diagnostic tool of claim 2, wherein the operator interface includes a keyboard.

5. The vehicle diagnostic tool of claim 2, wherein the operator interface includes a touchpad.

6. The vehicle diagnostic tool of claim 2, wherein the operator interface includes a joystick.

7. The vehicle diagnostic tool of claim 2, wherein the operator interface includes a microphone.

8. The vehicle diagnostic tool of claim 2, wherein the operator interface includes a trackball.

9. The vehicle diagnostic tool of claim 1, wherein the communications port is configured to transfer data to the external computing device utilizing a wireless connection that comprises at least one of the following: Wi-Fi protocol and Bluetooth protocol.

10. The vehicle diagnostic tool of claim 1, wherein the communications port is configured to transfer data to the external computing device utilizing a wireless connection that comprises a Wi-Fi protocol.

11. The vehicle diagnostic tool of claim 1, further comprising:

a speaker that is configured to generate audio feedback for the operator of the vehicle diagnostic tool.

12. The vehicle diagnostic tool of claim 1, further comprising:

a speaker that is configured to generate audio feedback for the operator of the vehicle diagnostic tool that comprises alarms.

13. The vehicle diagnostic tool of claim 1, further comprising:

a speaker that is configured to generate audio feedback for the operator of the vehicle diagnostic tool that comprises recorded instructions.

14. The vehicle diagnostic tool of claim 1, wherein the mobile broadband port is configured with a plurality of software drivers comprising at least one of the following: a GSM driver, a GPRS driver, a 3G driver, a WiMAX driver, an LTE UMTS/HSPA driver, an EV-DO driver, and a portable satellite-based system protocol driver.

15. The vehicle diagnostic tool of claim 1, wherein the mobile broadband port is configured with a plurality of software drivers comprising at least an LTE UMTS/HSPA driver.

16. The vehicle diagnostic tool of claim 1, further comprising:

an operator interface electronically connected to the processor and configured to allow an operator of the vehicle diagnostic tool to provide input to the vehicle diagnostic tool; and a speaker that is configured to generate audio feedback for the operator of the vehicle diagnostic tool, wherein the operator interface includes at least one of the following: a keyboard, a touchpad, a joystick, a microphone, and a trackball; and wherein the mobile broadband port is configured with a plurality of software drivers comprising at least one of the following: a GSM driver, a GPRS driver, a 3G, a WiMAX driver, an LTE UMTS/HSPA driver, an EV-DO driver, and a portable satellite-based system protocol driver.

17. The vehicle diagnostic tool of claim 1, further comprising:

an operator interface electronically connected to the processor and configured to allow an operator of the vehicle diagnostic tool to provide input to the vehicle diagnostic tool; and a speaker that is configured to generate audio feedback for the operator of the vehicle diagnostic tool, wherein the operator interface includes at least one of the following: a keyboard, a touchpad, a joystick, a microphone, and a trackball; and wherein the mobile broadband port is configured with a plurality of software drivers comprising at least an LTE UMTS/HSPA driver.

18. The vehicle diagnostic tool of claim 1, further comprising:

an operator interface electronically connected to the processor and configured to allow an operator of the vehicle diagnostic tool to provide input to the vehicle diagnostic tool; and a speaker that is configured to generate audio feedback for the operator of the vehicle diagnostic tool, wherein the mobile broadband port is configured with a plurality of software drivers comprising at least an LTE UMTS/HSPA driver; and wherein the operator interface includes a touchpad.

19. The vehicle diagnostic tool of claim 1, further comprising:

an operator interface electronically connected to the processor and configured to allow an operator of the vehicle diagnostic tool to provide input to the vehicle diagnostic tool; and a speaker that is configured to generate audio feedback for the operator of the vehicle diagnostic tool, wherein the mobile broadband port is configured with a plurality of software drivers comprising at least one of the following: a GSM driver, a GPRS driver, a 3G, a WiMAX driver, an LTE UMTS/HSPA driver, an EV-DO driver, and a portable satellite-based system protocol driver; and wherein the operator interface includes a touchpad.

* * * * *